F. M. PATTERSON.
VALVE.
APPLICATION FILED OCT. 5, 1910.

1,188,820.

Patented June 27, 1916.

Witnesses
Daniel Webster, Jr.
E. H. Barlow.

Inventor
Franklin M. Patterson
By
Attorney

UNITED STATES PATENT OFFICE.

FRANKLIN M. PATTERSON, OF BAYONNE, NEW JERSEY.

VALVE.

1,188,820.

Specification of Letters Patent.

Patented June 27, 1916.

Application filed October 5, 1910. Serial No. 585,367.

*To all whom it may concern:*

Be it known that I, FRANKLIN M. PATTERSON, a citizen of the United States, and a resident of Bayonne, county of Hudson, State of New Jersey, have invented an Improvement in Valves, of which the following is a specification.

My invention has reference to valves and consists of certain improvements which are fully set forth in the following specification and shown in the accompanying drawings which form a part thereof.

The object of my invention is to provide a valve suitable for use with steam turbine engines and other devices where steam is supplied under full head, and which, from any accident or other cause, requires to be suddenly shut off, the valve being so arranged that the inertia of the steam being thus suddenly shut off, may relieve itself through a by-pass and thereby avoid sudden shock to the apparatus which would be very objectionable and very dangerous.

In employing my invention in commercial use, the valve device is arranged in the ordinary supply pipe to the engine or other device, and is in addition connected with an exhaust or waste pipe through which the flow of steam may be temporarily shunted, and which latter pipe is provided with a suitable globe or other valve for closing off the escape of the steam when shunted into the escape or waste pipe. The main supply pipe may also be provided with a globe or other suitable valve which may be closed, so that my improved valve is only required to act as an intermediate device between the main globe valve and the engine for quickly diverting the steam, should occasion require such action.

More specifically, my invention consists of a valve body having one inlet port and two outlet ports, said inlet and outlet ports being separated by a valve chamber, and a movable or sliding valve piece provided with an operating handle or shaft by which the said valve piece may be quickly adjusted to close either of the outlet ports at will; and preferably opening one of said outlet ports while in the act of closing the other outlet port, so that the steam may be divided and temporarily flow through both of the ports as an incident to its being closed off one and made to flow wholly through the other.

Figure 1:
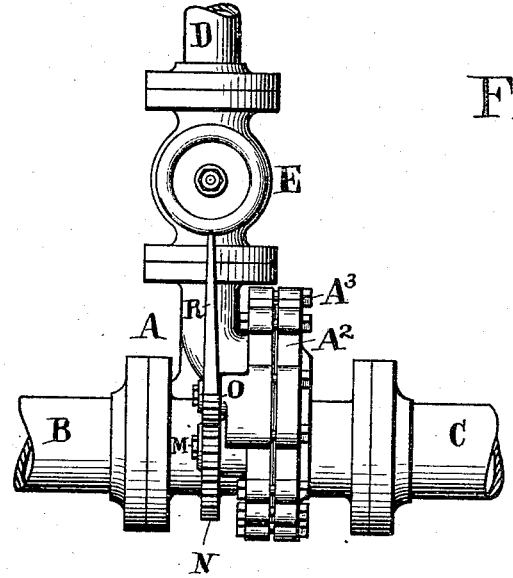
Figure 2:
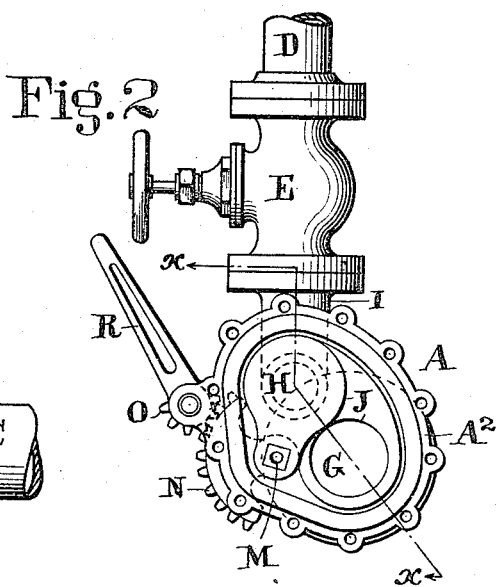
Figure 3:
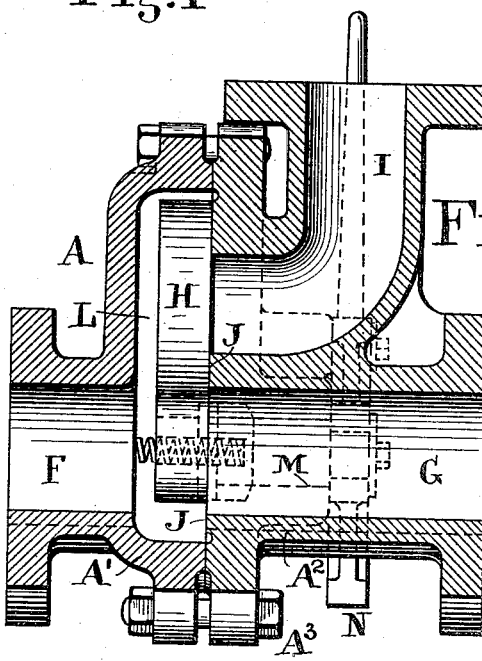

My invention further comprehends details of construction which, together with the features above described, will be better understood by reference to the drawings, in which:

Figure 1 is an elevation of my improved valve in connection with the supply pipe, the pipe leading to the engine, and the escape pipe; Fig. 2 is a side view of the same with that part of the valve leading to the engine removed to show the interior construction; and Fig. 3 is a sectional elevation of the valve proper on the dotted line $x$—$x$ of Fig. 2.

A is my improved valve and is connected by its inlet port F with the supply pipe B, and by its outlet port G with the pipe C leading to the engine or other place to which the steam is to be supplied. This valve is further provided with the vent outlet port I which connects with an exhaust pipe D through a globe or other throttling valve E. The casing of the valve A is preferably made in two parts, A' and $A^2$ which are bolted together by bolts $A^3$. Between these two parts of the casing is the valve chamber L, which is preferably at all times in free communication with the inlet port F. The part of the casing $A^2$, in which the outlet ports G and I are arranged, is provided with a valve seat J preferably continuous with respect to the said two outlet ports.

H is a valve piece which has its face adapted to form a tight surface contact with the valve seat J and said valve piece is carried on the end of a rocking spindle M which extends through the valve casing and is provided upon the outer end with suitable means to rock it, the means in the present illustration being a gear segment N which is operated by the pinion O and a hand lever R. In the illustration Figs. 2 and 3, the valve piece is shown as closing the outlet I and providing a free passage for the steam from the inlet F to the outlet G. When the lever R is thrown downward, the valve piece H is swung about the axis of the spindle M into a position which will close the port G and open the port I, by which action the supply of the steam from the inlet F to the outlet G is shut off abruptly and simultaneously therewith supplied to the outlet I by which it may escape through the waste pipe D. This waste pipe D may connect with the exhaust pipe of the engine (if not a condensing engine) or may convey the steam to any place desired. In the particular proportioning of the parts shown, the movement of the valve piece H will partly throttle the outlet G before opening the outlet I, and the final movement of the said valve piece will simultaneously continue to close the outlet G while gradually opening the outlet I to the full extent.

It will be observed that the outlet I leading to the waste or exhaust pipe D is of smaller area than the outlet G so that there is some throttling effect by the movement of the valve piece H when shunted from the position over the outlet I to the outlet G, and this extent of throttling would be permissible since the change would take place more or less gradually, first by the gradual closing of the outlet G, and then further closing of said outlet G while opening the outlet I. After the steam has been diverted through the outlet I with the throttling action due to the difference in the areas of the pipes G and I, the escape of the said steam may be gradually shut off by closing the globe valve E.

I do not limit myself to the details of construction of the valve, but my invention comprehends broadly a valve adapted for the use herein described for quickly shutting off the supply of steam to a turbine or other engine or similar mechanism, and opening a relief port between the supply and escape pipe for preventing injury due to the inertia of the rapidly flowing steam, thus suddenly checked on its way to the engine. While I prefer the construction shown, the details thereof may be varied without departing from the spirit of the invention.

Having now described my invention, what I claim as new and desire to secure by Letters Patent, is:—

1. In a valve, the combination of a case having a valve chamber provided with a continuous flat valve seat with two outlet ports of different areas opening through said seat and also having an inlet port opening into the chamber said inlet port being of an area substantially as large as the larger of the outlet ports, a single valve piece movable parallel to and in continuous contact over the surface of the valve seat to close either of the outlet ports but not both at the same time and to first partly throttle the large port and then gradually open the smaller port while closing the larger port, and means extending from the valve piece to the outside of the case for moving said valve piece.

2. In a valve, the combination of a case having a valve chamber provided with a continuous flat valve seat and two outlet ports of different areas opening through said seat in close proximity and an inlet port opening into the chamber and of an area substantially as large as the larger of the outlet ports, a slidable flat valve piece movable parallel to and in continuous contact over the surface of the valve seat to close either of the outlet ports but not both at the same time, means extending from the valve piece to the outside of the case for moving said valve piece, and a separate valve device for independently and tightly closing the outlet of smaller area, whereby the steam may be quickly shut off from the outlet of larger area to throttle its flow and while this is being done admitting steam to the outlet of smaller area and then slowly shutting off the flow of steam from the latter.

3. In a valve for emergency duty, the combination of a valve case having a valve chamber provided with an inlet port and two outlet ports of different areas, a single quick action valve piece having means for shifting it to cut off flow through either of the outlet ports but not both at one time so that it will permit flow through both outlet ports during the time it is being shifted to either of the extreme positions, whereby the flow of steam may be shut off the outlet of larger area and somewhat throttled by being allowed to flow through the port of smaller area, and a separate and independently operated slow action valve piece to shut off the flow of steam through the port of smaller area.

4. In a valve for emergency duty, a valve casing in two parts one of which has a flat valve seat and two outlet ports of different areas opening through the seat and the other of which is recessed and having an inlet port arranged so as to come into alinement with the outlet port of larger area when the case is assembled, a pivoted valve piece arranged to slide over the valve seat and of less thickness than the depth of the recessed portion of the case so as not to obstruct the inlet, said valve piece shaped to partly open both ports at one time during shifting and to fully open either port only at one time, a spindle journaled in the case for reciprocating the valve piece over the valve seat to close either of the two outlet ports, and a secondary valve mechanism for closing the outlet port of smaller area, whereby the outlet port of larger area may be closed and outlet port of smaller area opened with rapidity and the fluid partly throttled and then shut off gradually.

In testimony of which invention, I hereunto set my hand.

FRANKLIN M. PATTERSON.

Witnesses:
PERRY HAYNES,
P. J. WALSH.

Copies of this patent may be obtained for five cents each, by addressing the "Commissioner of Patents, Washington, D. C."